US011433476B2

(12) United States Patent
Dulaney et al.

(10) Patent No.: US 11,433,476 B2
(45) Date of Patent: Sep. 6, 2022

(54) APPARATUS FOR LASER PEENING HIDDEN SURFACES

(71) Applicant: LSP Technologies, Inc., Dublin, OH (US)

(72) Inventors: Jeff Dulaney, Dublin, OH (US); Gary Grossenbacher, Dublin, OH (US)

(73) Assignee: LSP Technologies, Inc., Dublin, OH (US)

( * ) Notice: Subject to any disclaimer, the term of this patent is extended or adjusted under 35 U.S.C. 154(b) by 404 days.

(21) Appl. No.: 16/391,593

(22) Filed: Apr. 23, 2019

(65) Prior Publication Data

US 2019/0321911 A1 Oct. 24, 2019

Related U.S. Application Data

(60) Provisional application No. 62/661,161, filed on Apr. 23, 2018.

(51) Int. Cl.
*B23K 26/00* (2014.01)
*C21D 10/00* (2006.01)
(Continued)

(52) U.S. Cl.
CPC .......... *B23K 26/009* (2013.01); *B23K 26/035* (2015.10); *B23K 26/064* (2015.10); *C21D 10/005* (2013.01)

(58) Field of Classification Search
CPC .. B23K 26/009; B23K 26/064; B23K 26/035; B23K 26/146; B23K 26/356; C21D 10/005
See application file for complete search history.

(56) References Cited

U.S. PATENT DOCUMENTS 5,066,846 A * 11/1991 Pirl ..................... B23K 26/106
219/121.63
5,491,317 A * 2/1996 Pirl ..................... B23K 26/106
219/121.63
(Continued)

FOREIGN PATENT DOCUMENTS

EP 3020501 A1 11/2014
JP 2005313191 A 11/2005
(Continued)

OTHER PUBLICATIONS

Machine translation of Japan Patent document No. 2017127887A, Jun. 2022 (Year: 2022).*

(Continued)

*Primary Examiner* — Geoffrey S Evans
(74) *Attorney, Agent, or Firm* — Kern Kendrick, LLC; Benjamen E. Kern

(57) ABSTRACT

A laser shock peening apparatus is provided for use with a workpiece having a cavity. The apparatus includes a tubular body configured for insertion longitudinally inward of the cavity. The tubular body has a peripheral wall bounding a laser delivery channel, and has an aperture reaching outward from the laser delivery channel through the peripheral wall. An optical device is located in the laser delivery channel. The optical device is configured to direct a laser beam outward through the aperture. Additionally, the peripheral wall has internal surfaces defining a water delivery channel configured to convey a stream of overlay water to the aperture.

20 Claims, 6 Drawing Sheets

(51) Int. Cl.
*B23K 26/064* (2014.01)
*B23K 26/035* (2014.01)

(56) References Cited

U.S. PATENT DOCUMENTS

| | | | | |
|---|---|---|---|---|
| 5,514,849 | A | * | 5/1996 | Findlan ................. B23K 26/28 |
| | | | | 219/121.63 |
| 5,611,948 | A | * | 3/1997 | Hawkins ................ B65H 63/00 |
| | | | | 219/121.63 |
| 6,512,584 | B1 | | 1/2003 | O'Loughlin et al. |
| 8,794,215 | B2 | | 8/2014 | Hirano et al. |
| 9,144,861 | B2 | * | 9/2015 | Sokol ................. B23K 26/356 |
| 9,186,751 | B2 | | 11/2015 | Chida et al. |
| 9,464,611 | B2 | | 10/2016 | Sugihashi et al. |
| 10,780,527 | B2 | | 9/2020 | Richerzhagen et al. |
| 2012/0205349 | A1 | * | 8/2012 | Uehara ................ B23K 26/128 |
| | | | | 219/121.61 |
| 2012/0325788 | A1 | * | 12/2012 | Sokol ................ B23K 26/0648 |
| | | | | 219/121.75 |
| 2015/0239065 | A1 | * | 8/2015 | Nomura ................ B23K 26/103 |
| | | | | 219/121.84 |
| 2016/0136757 | A1 | * | 5/2016 | May .................... B23K 26/356 |
| | | | | 219/121.61 |
| 2016/0138127 | A1 | * | 5/2016 | Nomura .................. C21D 7/04 |
| | | | | 72/56 |
| 2016/0288258 | A1 | * | 10/2016 | Nomura ............... B23K 26/356 |
| 2017/0083001 | A1 | | 3/2017 | Kung et al. |
| 2018/0001417 | A1 | | 1/2018 | Dulaney et al. |
| 2018/0071863 | A1 | | 3/2018 | Ohno et al. |

FOREIGN PATENT DOCUMENTS

| | | | |
|---|---|---|---|
| JP | 2009074417 | A | 4/2009 |
| JP | 2009150272 | A | 7/2009 |
| JP | 2011064503 | A | 3/2011 |
| JP | 5649332 | B2 | 1/2015 |
| JP | 5677033 | B2 | 2/2015 |
| JP | 2017-127887 | A | 7/2017 |
| JP | 2017127887 | A * | 7/2017 |
| JP | 6526580 | B2 | 6/2019 |
| JP | 6549007 | B2 | 7/2019 |
| JP | 6549878 | B2 | 7/2019 |

OTHER PUBLICATIONS

International Search Report for PCT/US2019-028646, dated Jul. 16, 2019.

Partial Supplementary European Search Report issued in E34979, dated Jul. 11, 2022.

* cited by examiner

APPARATUS FOR LASER PEENING HIDDEN SURFACES

RELATED APPLICATIONS

This application claims priority of provisional U.S. Patent application 62/661,161, filed Apr. 23, 2018, which is incorporated by reference.

TECHNICAL FIELD

This technology includes a laser beam delivery device and an apparatus for supporting the device in operative engagement with a workpiece.

BACKGROUND

In laser shock peening operations, it is sometimes necessary to laser peen surfaces that are hidden or out of direct line-of-sight for access by a laser beam from outside the workpiece. Such surfaces may be found, for example, inside cavities in the workpiece.

SUMMARY

A laser shock peening apparatus is provided for use with a workpiece having a cavity. The apparatus includes a tubular body configured for insertion longitudinally inward of the cavity. The tubular body has a peripheral wall bounding a laser delivery channel. An aperture reaches outward from the laser delivery channel through the peripheral wall. An optical device is located in the laser delivery channel, and is oriented to direct a laser beam outward through the aperture. Additionally, the peripheral wall has internal surfaces defining a water delivery channel for conveying a stream of overlay water to the aperture.

A support apparatus is configured to engage the workpiece in an installed position in which the support apparatus is releasably attached to the workpiece. When in the installed position, the support apparatus supports the delivery device in alignment with the cavity. In a given example, the support apparatus can be releasably retained in the installed position under the force of vacuum pressure.

DETAILED DESCRIPTION

Figure 1:
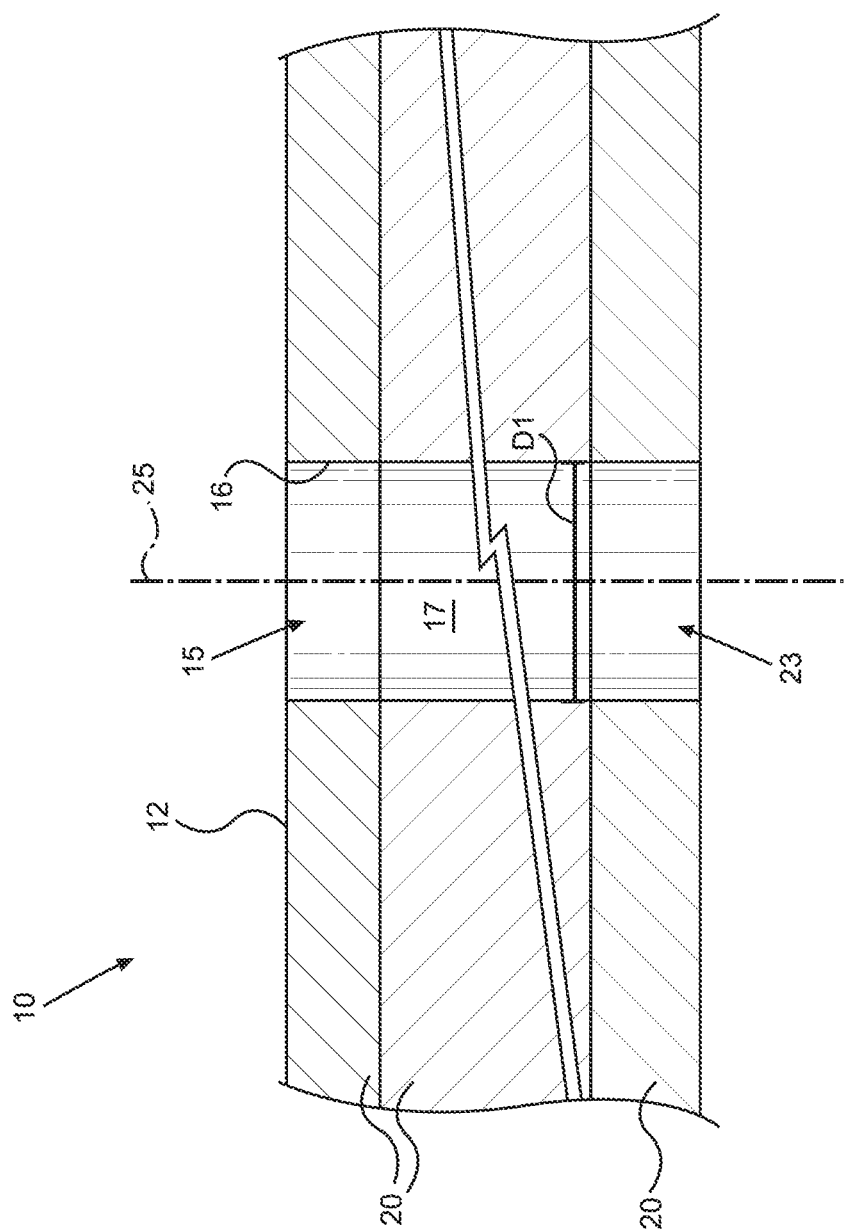
FIG. 1 is a sectional view of a workpiece to be treated by laser shock peening.

The structures illustrated in the drawings includes parts that are examples of the structural elements recited in the claims. The illustrated structures thus include examples of how a person of ordinary skill in the art can make and use the claimed invention. They are described here to meet the enablement and best mode requirements of the patent statute without imposing limitations that are not recited in the claims. One or more elements of one embodiment may be used in combination with, or as a substitute for, one or more elements of another as needed for any particular implementation of the invention.

The apparatus 10 shown in FIG. 1 is a workpiece for treatment by laser shock peening. The workpiece 10 has an outer surface 12 with an opening 15. An inner surface 16 of the workpiece defines a cavity 17 reaching inward from the outer surface 12. The cavity 17 in the given example is a bore. Such a workpiece 10 may have multiple overlapping parts 20, and the bore 17 may have an open inner end 23 at one such part 20.

In the example of FIG. 1, the inner surface 16 and the bore 17 have cylindrical shapes centered on an axis 25, and reach continuously through the workpiece 10 with a uniform diameter D1 from the opening 15 at the outer surface 12 to the open inner end 23. The bore 17 is configured to receive a fastener, such as a rivet or the like, for fastening the parts 20 together. Accordingly, the workpiece 10 may require laser shock peening suitable for engagement with a fastener, either originally or upon replacement, along the length of the inner surface 16 in the bore 17.

Figure 2:
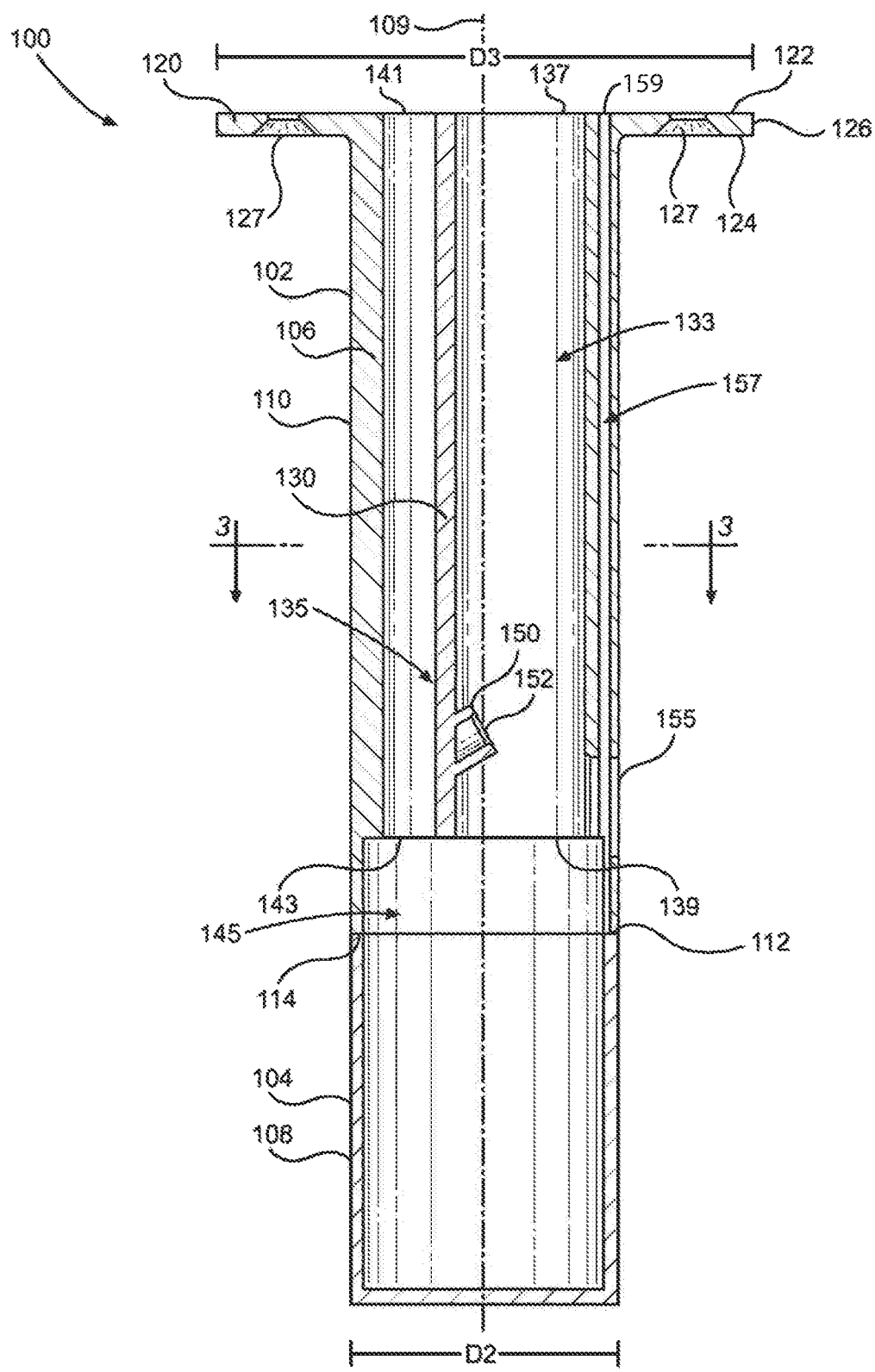
FIG. 2 is a sectional view of a device for use in laser shock peening.
Figure 3:
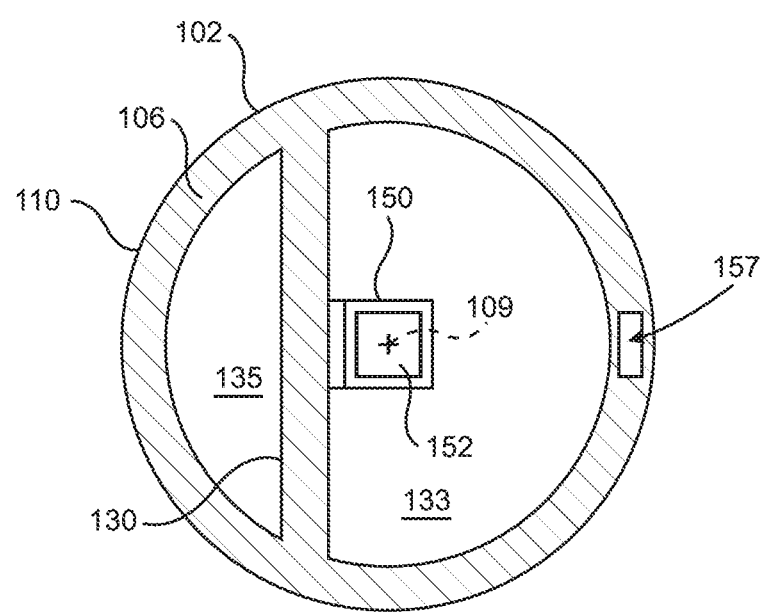
FIG. 3 is a sectional view taken on line 3-3 of FIG. 2.

The apparatus 100 shown in FIGS. 2 and 3 is a laser beam delivery device for treating a workpiece by laser shock peening. The delivery device 100, which may be referred to as a targeting device, is configured to direct a laser beam onto a workpiece at a surface within a cavity in the workpiece. With reference to the example shown in FIG. 1, the delivery device 100 is thus configured to deliver a laser beam to the workpiece 10 for treatment by laser shock peening at the inner surface 16 within the bore 17.

In the illustrated example, the delivery device 100 has separate parts including a tubular body 102 and an end cap 104. The tubular body 102 has an elongated peripheral wall 106 with a cylindrical shape centered on an axis 109. An outer surface 110 of the peripheral wall 106 has a uniform outer diameter D2. The outer diameter D2 on the delivery device 100 is less than the inner diameter D1 on the workpiece 10.

An open top 112 of the end cap 104 is joined to an open bottom 114 of the tubular body 102. The end cap 104 also has a cylindrical shape, with an outer surface 118 providing the same uniform outer diameter D2, and projects concentrically downward along the axis 109 as viewed in the upright orientation shown in FIG. 1.

A flange portion 120 of the delivery device 100 is located at the upper end of the tubular body 102. The flange portion 120 has a planar opposite side surfaces 122 and 124 perpendicular to the axis 109, with a circular peripheral edge 126 having a diameter D3 centered on the axis 109.

The diameter D3 is greater than the diameter D2, and is greater than the diameter of the opening 15 at the outer surface 12 of the workpiece 10. Apertures 127 reach through the flange 120 for fasteners to install the delivery device 100 in a support apparatus that inserts the delivery device 100 into the bore 17 through the opening 15 at the outer surface 12 of the workpiece 10. The support apparatus can include the applicator device 128 shown in FIG. 4.

An interior wall 130 reaches straight across the tubular body 102. The interior wall 130 is shaped as a chord that divides the interior space into first and second channels 133 and 135 shaped as arcuate segments. The first channel 133 has an open upper end 137 at the top of the tubular body 102, and has an open lower end 139 spaced a short distance upward from the bottom 114 of the tubular body 102. The second channel 135 has open upper and lower ends 141 and 143 beside those of the first channel 135. A cylindrical lower end chamber 145 is located between the channels 133 and 135 and the open bottom 114.

A mirror mount 150 is located on the interior wall 130 in a predetermined path to be taken by a laser beam directed into the first channel 133 through the open upper end 137. In the illustrated example, the predetermined path is centered on the axis 109. A mirror 152 is mounted on the mirror mount 150, and is inclined to the axis 109 so as to direct the laser beam across the first channel 133 to a beam delivery slot 155 (FIG. 2) that extends through the peripheral wall 106.

As further shown in FIGS. 2 and 3, the peripheral wall 106 has interior surfaces defining a third channel 157 within the thickness of the peripheral wall. The third channel 157 has an open upper end 159 beside the open upper end 137 of the first channel 133, and reaches through the peripheral wall 106 longitudinally downward to the beam delivery slot 155.

As noted above, the delivery device 100 is configured for insertion in the bore 17 in the workpiece 10. The tubular body then extends axially within the bore 17, with the beam delivery slot 155 positioned closely adjacent to the inner surface 16 of the workpiece 10. A laser beam emitted from the slot 155 can be directed progressively against the entire area of the inner surface 16 by rotating the delivery device 100 about the axis 109 to move the beam circumferentially about the inner surface 16, and by moving the delivery device 100 along the axis 25 to move the beam through the depth of the bore 17 along the length of the inner surface 16.

When a laser beam is applied to the inner surface 16 of the workpiece 10, water is simultaneously applied as a transparent overlay at the inner surface 16. This is accomplished by directing a stream of water into and through the third channel 157. The stream of water emerging from the third channel 157 flows axially downward through the beam delivery slot 155. The stream of water is thus directed axially over the adjacent inner surface 16 of the workpiece beside the beam delivery slot 155.

Some of the overlay water will escape through the space located radially between the inner surface 16 of the workpiece and the outer surface 110 of the tubular body 102. However, some or most of the water will continue to flow downward from the beam delivery slot 155 through the lower end chamber 145 and into the end cap 104. Therefore, as a means for removing water from the delivery device 100, a pressurized flow of air is simultaneously provided downward through the first channel 133. The pressurized flow of air emerges from the open lower end 139 of the first channel 133, and continues downward through the end chamber 145 to the end cap 104, where it turns back upward toward and through the open lower end 143 of the second channel 135. Water that would otherwise collect in the end cap 104 is carried by the pressurized flow of air so that both the air and the water are driven upward and outward through the second channel 135. Preferably, the pressurized flow of air is driven by vacuum pressure at the outlet end 141 of the second channel 135.

A particular feature of the delivery device 100 relates to the placement of the mirror 152 relative to the delivery slot 155. As shown in FIG. 2, mirror 152 in the illustrated example is spaced axially upward from the delivery slot 155. This helps to keep the mirror 152 at a distance from turbulence in the stream of water emerging from the third channel 157 at the delivery slot 155, and thus helps to ensure that the reflected laser beam is not adversely affected by the water.

Figure 4:
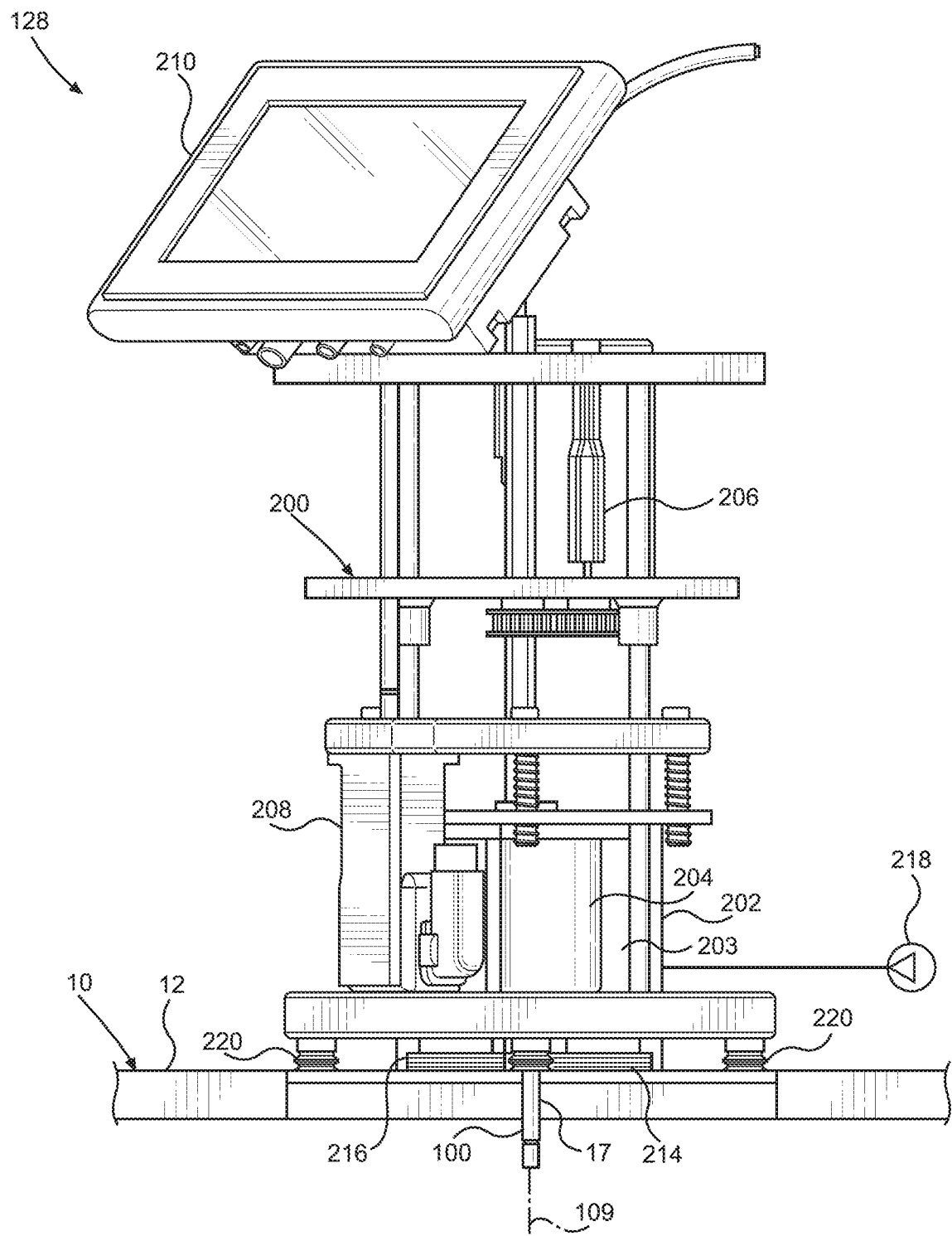
FIG. 4 is a front view of an apparatus for use with the device of FIG. 2.

As shown in FIG. 4, the applicator device 128 for inserting the delivery device 100 into the bore 17 has multiple components supported on a frame 200. These include a housing 202 with a vacuum sealing chamber 203 for releasably attaching the applicator device 128 to a workpiece. In the given example, the applicator device 128 is shown to be attached to the workpiece 10 of FIG. 1. Other parts of the applicator device 128 include a laser beam amplifier 204 for providing an amplified beam to the delivery device 100, with a motorized rotational drive 206 and a motorized vertical drive 208 for moving the delivery device 100 within the bore 17 as described above. A controller 210 with a user interface also is provided in the example of FIG. 4.

The housing 202 defines closed boundaries of the sealing chamber 203, but also provides the sealing chamber 203 with an open bottom 214. A sealing ring 216 reaches fully around the open bottom 214. In the installed position of FIG. 4, the open bottom 214 faces the outer surface 12 of the workpiece 10, with the sealing ring 216 overlying the outer surface 12. A pump 218 (shown schematically) provides vacuum pressure within the sealing chamber 203. With the outer surface 12 of the workpiece 10 effectively defining a closed boundary at the bottom of the sealing chamber 203, the vacuum pressure retains the applicator device 128 in place on the outer surface 12. The sealing ring 216 is compliant so as to adopt the contour of the outer surface 12 as needed for an airtight seal at the installed location. Suction cups 220 may also be provided to ensure that the installed apparatus 128 is securely retained in place.

Figure 5:
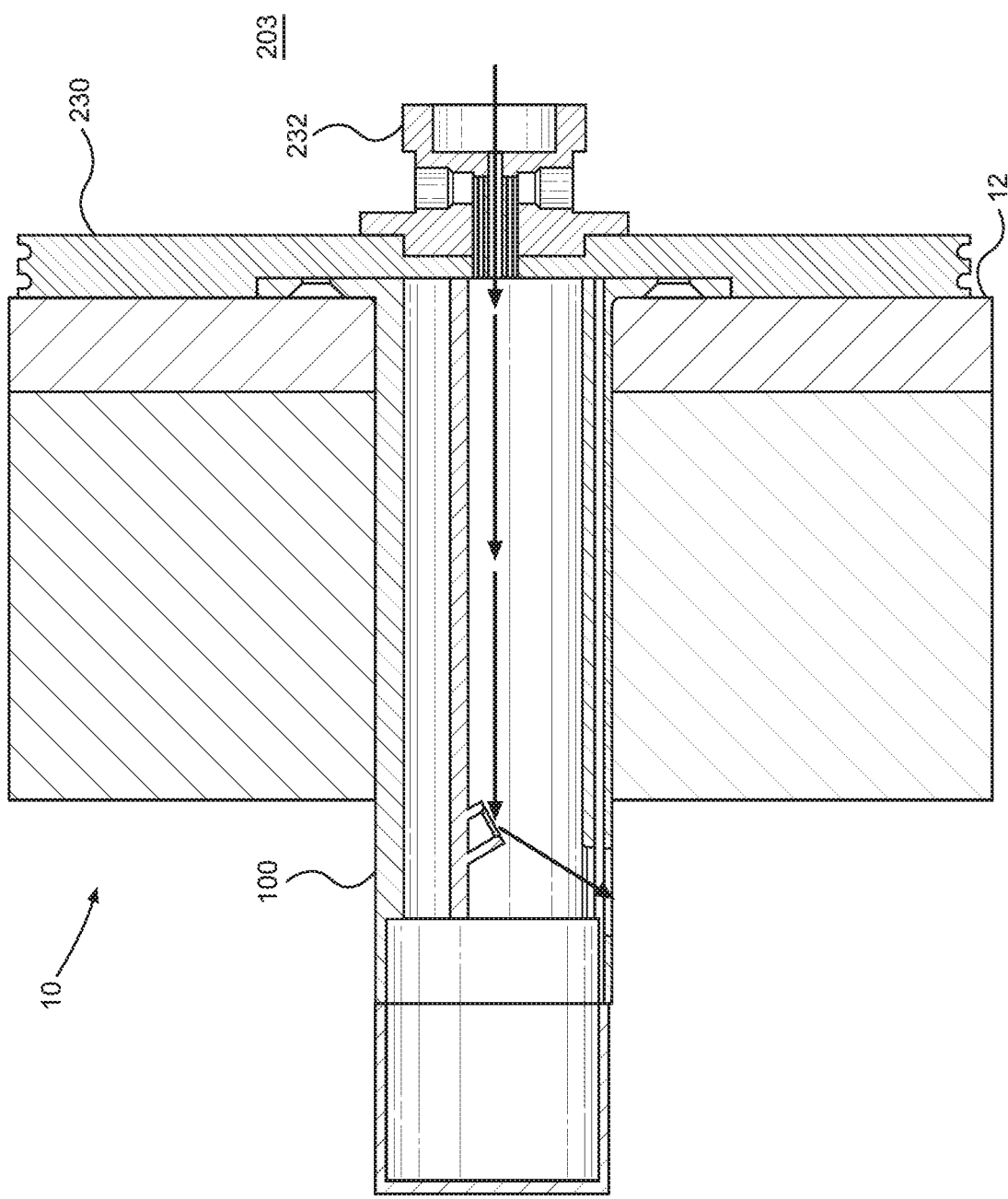
FIG. 5 is an enlarged sectional view of parts shown in FIG. 4.

As best shown in FIG. 5, the delivery device 100 is fastened to a platform 230 within the sealing chamber 203. A coupling 232 is configured to interconnect the delivery device 100 with a hydraulic line extending from a source of overlay water, and a pneumatic line extending from a source of pressurized air for driving the water through the delivery device 100.

The coupling 232 is further configured to engage an optical fiber interconnecting the delivery device 100 with the laser beam amplifier 204. The amplifier 204 is interconnected with a remote source of a laser beam that is pulsed for laser shock peeing at the inner surface 16 of the workpiece 10. By locating the amplifier 204 at the applicator device 128 instead of the remote laser source, the arrangement of FIG. 4 reduces the length of optical fiber through which the amplified beam must travel to reach the delivery device 100. This provides a corresponding reduction in the energy loss between the amplifier 204 and the delivery device 100.

In use, the applicator device 128 may be moved from place to place on the outer surface 12 of the workpiece 10 to perform laser shock peening operations at each of a multitude of bores 17. The applicator device 128 is first located above a selected bore 17, with the targeting device 100 aligned but retracted upward from the bore 17. The vertical drive 208 and the vacuum pump 218 are actuated under the influence of the controller 210 to secure the applicator device 128 in place, and to move the delivery device 100 longitudinally into the bore 17. The amplifier 204, the remote laser source, and the sources of water and pressurized air can then be actuated by the controller 210 to perform a laser peening operation as described above. When the laser peening operation is completed, the vacuum pump 218 can be deactivated to release the applicator device 128 for movement to another location.

Figure 6:
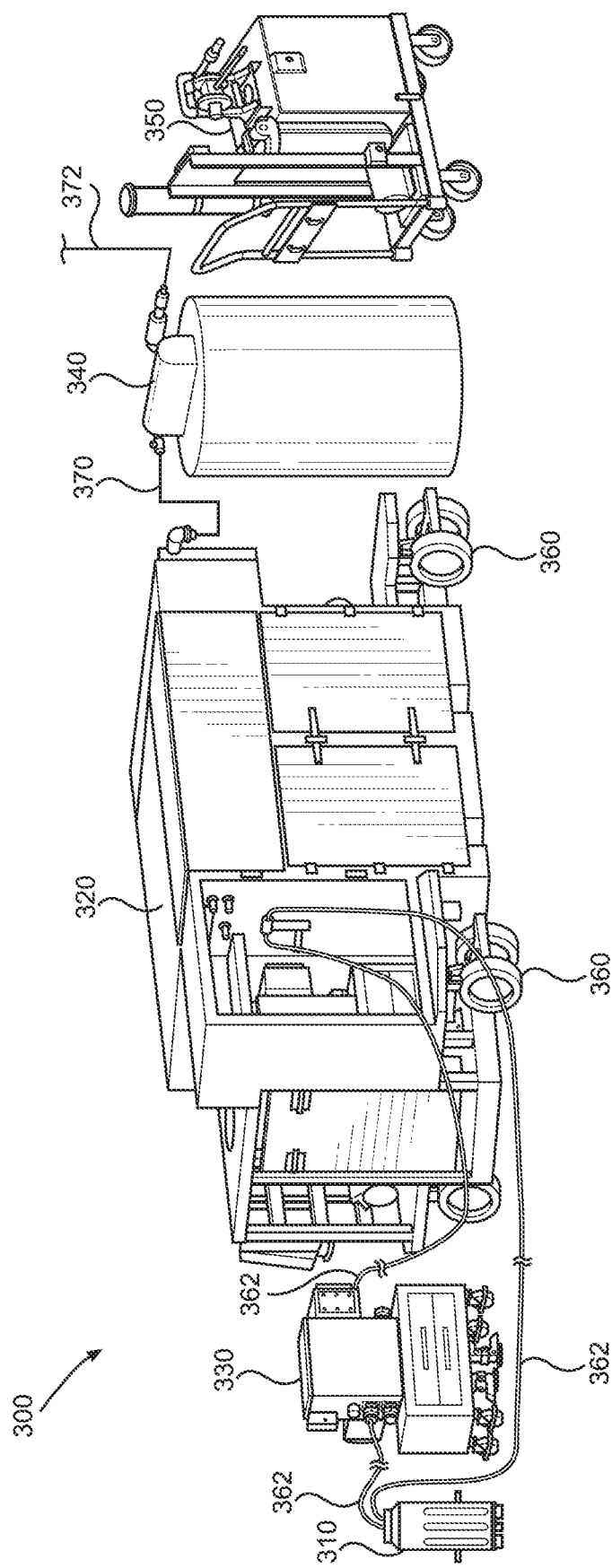
FIG. 6 is a view of components included in a portable system for treating one or more workpieces by laser shock peening.

FIG. 6 shows an example of a system 300 for performing laser peening at multiple surface locations on one or more workpieces. This system 300 is particularly suitable for performing laser peening at the inner surfaces of multiple spar fastener bores in an aircraft wing. As show, the system 300 includes include portable components that are configured for deploying the beam delivery device 100 throughout the multiple surface locations. The portable components of the system 300 include a support apparatus in the form of an applicator device 310. The portable components further include an enclosure 320, a verification stand 330, a water removal vacuum 340, and a reverse osmosis water system 350.

Unlike the applicator device 128 described above, this example of an applicator device 310 does not include a controller with a user interface. However, the applicator device 310 is otherwise configured with a structure and function substantially the same as the applicator device 128 of FIG. 4. The applicator device 310 is thus configured for releasable coupling with a workpiece to support and move a delivery device like the delivery device 100 in the same manner described above. The applicator device can thus be deployed between multiple bore locations on the upper surface of an aircraft wing.

The enclosure 320 has components for providing the applicator device 310 with a laser beam, power, overly water, and a flow of air for removing the water, all as described above. The enclosure 320 further has a user interface and a controller for providing the applicator device 310 with control signals for operating the vacuum pump that attaches the applicator device 310 to a workpiece, as well as control signals for operating the motors that insert, advance, retract, and rotate the delivery device in a workpiece bore. As shown, the enclosure 320 in this example has wheels 360 for rolling across a floor.

The verification stand 330 is operatively interposed between the enclosure 320 and the applicator device 310. This component of the system 300 includes a controller for evaluating the laser beam at the applicator device 310 to verify characteristics such as spot size, energy, temporal profile, etc. Umbilicals 362 communicate the enclosure 320 with the applicator device 310 and the verification stand 330 to convey power, overlay water, air, and control signals as needed for the enclosure 320 to operate both the applicator device 310 and the verification stand 330. In this example, the verification stand 330 also has wheels for rolling across a floor. The verification stand 330 can also be carried on a scissor lift or other suitable hoisting device for proximity and maneuverability relative to an aircraft wing.

The water removal vacuum 340 includes a venturi device that is driven by a flow of air provided from the enclosure 320 through an air line 370. A vacuum air line 372 is extended from the water removal vacuum 340 to a location where excess water from the laser beam delivery device needs to be collected and removed.

The reverse osmosis water system 350 is included in the system 300 to purify water obtained from a shop source, and to provide the purified water to a tank in the enclosure.

This written description sets for the best mode of carrying out the invention, and describes the invention so as to enable a person of ordinary skill in the art to make and use the invention, by presenting examples of the elements recited in the claims. The detailed descriptions of those elements do not impose limitations that are not recited in the claims, either literally or under the doctrine of equivalents.

What is claimed is:

1. An apparatus for use with a workpiece having a surface within a cavity in the workpiece, comprising:
    a tubular body configured for insertion longitudinally inward in the cavity beside the inner surface of the workpiece, including a peripheral wall bounding a laser beam delivery channel, with an aperture reaching outward from the laser beam delivery channel through the peripheral wall; and
    an optical device located in the laser beam delivery channel and configured to direct a laser beam outward through the aperture;
    wherein the peripheral wall has thickness and has internal surfaces defining a water delivery channel that is located within the thickness of the peripheral wall, the water delivery channel reaching through the peripheral wall longitudinally to the aperture and configured to convey a stream of overlay water to the aperture.

2. An apparatus as defined in claim 1 wherein the tubular body has an air-water outlet and defines an air-water return channel communicating the aperture with the air-water outlet separately from the laser delivery channel.

3. An apparatus as defined in claim 2 wherein the air-water outlet is located at an outer end portion of the tubular body.

4. An apparatus as defined in claim 2 further comprising a coupling configured to connect an optical fiber with the laser beam delivery channel, to connect a pneumatic line with the laser beam delivery channel, and to connect a hydraulic line with the water delivery channel.

5. An apparatus as defined in claim 1 wherein the optical device is spaced longitudinally from the aperture.

6. An apparatus for use with a workpiece having a surface within a cavity in the workpiece, comprising:
    a laser beam delivery device configured for insertion in the cavity beside the inner surface of the workpiece, including a peripheral wall bounding a laser beam delivery channel, with an aperture reaching outward from the laser beam delivery channel through the peripheral wall;
    an optical device located in the laser beam delivery channel and configured to direct a laser beam outward through the aperture; and
    a support apparatus configured to engage the workpiece in an installed position in which the support apparatus is releasably attached to the workpiece and supports the laser beam delivery device in the cavity.

7. An apparatus as defined in claim 6 wherein the support apparatus is configured to insert the laser beam delivery device into the cavity.

8. An apparatus as defined in claim 6 wherein the support apparatus is configured to move the laser beam delivery device within the cavity.

9. An apparatus as defined in claim 8 wherein the support apparatus is configured to rotate the laser beam delivery device within the cavity.

10. An apparatus as defined in claim 8 wherein the support apparatus is configured to vary the depth of the laser beam delivery device within the cavity.

11. An apparatus as defined in claim 6 wherein the support apparatus includes a compressible element configured to conform to a contour of the outer surface of the workpiece when the support apparatus is in the installed position.

12. An apparatus as defined in claim 6 wherein the support apparatus includes means for retaining the support apparatus in the installed position under the force of vacuum pressure.

13. An apparatus as defined in claim 6 wherein the support apparatus includes a housing defining closed boundaries of a vacuum chamber having an open side and is configured for the outer surface of the workpiece to close the open side of the vacuum chamber when the support apparatus is in the installed position.

14. An apparatus as defined claim 6 wherein the support apparatus is configured for coupling the laser beam delivery device with an optical fiber reaching from the support apparatus to a laser source.

15. An apparatus as defined in claim 6 wherein the support apparatus is configured for coupling the laser beam delivery device with a source of overlay water.

16. An apparatus as defined in claim 6 further comprising a laser beam amplifier on the support apparatus.

17. An apparatus for use with a workpiece having an outer surface with an opening and an inner surface defining a cavity reaching inward from the opening, comprising:
- a laser beam delivery device configured for insertion inward of the cavity beside the inner surface of the workpiece, including a peripheral wall bounding a laser beam delivery channel, with an aperture reaching outward from the laser beam delivery channel through the peripheral wall;
- an optical device located in the laser beam delivery channel and configured to direct a laser beam outward through the aperture; and
- a support apparatus configured to engage the workpiece in an installed position in which the support apparatus supports the laser beam delivery device inside the cavity, wherein the support apparatus includes a motorized drive interconnected with the laser beam delivery device to move the laser beam delivery device within the cavity;
- a laser beam source remote from the support apparatus; and
- an optical fiber interconnecting the support apparatus with the laser beam source.

18. An apparatus as defined in claim 17 wherein the support apparatus incudes a laser beam amplifier.

19. An apparatus as defined in claim 17 wherein the support apparatus includes a compressible element configured to conform to a contour of the outer surface of the workpiece when the support apparatus is in the installed position.

20. An apparatus as defined in claim 17 wherein the support apparatus includes a housing defining closed boundaries of a vacuum chamber having an open side and is configured for the outer surface of the workpiece to close the open side of the vacuum chamber when the support apparatus is in the installed position.

* * * * *